Figure 1:
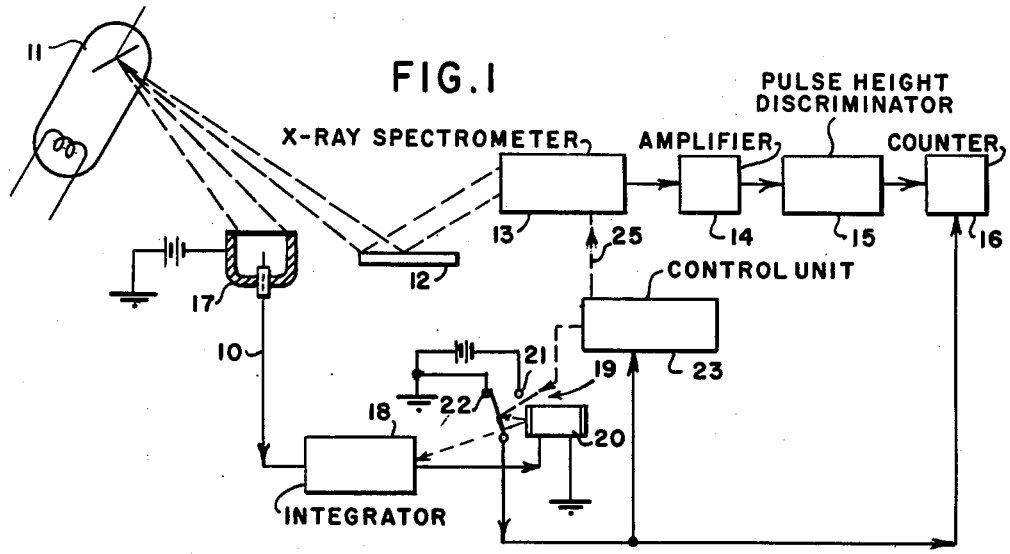

July 28, 1964

J. E. BIGELOW 3,142,803

DRIFT COMPENSATED D.C. INTEGRATOR HAVING SEPARATE
SELECTIVELY INSERTABLE FEEDBACK LOOPS

Filed July 29, 1960

JOHN EDWARD BIGELOW
*INVENTOR.*

BY *Irving Kayton*

ATTORNEY

United States Patent Office 3,142,803
Patented July 28, 1964

3,142,803
DRIFT COMPENSATED D.C. INTEGRATOR HAVING SEPARATE SELECTIVELY INSERTABLE FEEDBACK LOOPS
John Edward Bigelow, Milwaukee, Wis., assignor to General Electric Company, a corporation of New York
Filed July 29, 1960, Ser. No. 46,245
3 Claims. (Cl. 328—127)

This invention relates to electronic integrating systems and more particularly to an electronic system for integrating with high precision varying direct currents suitable for use in sensitive electronic control systems.

The integrator, in accordance with the invention, is especially adapted for use in those control circuits wherein periodic or interrupted operation of the system is characteristic, and most especially wherein the period of operation is a function of the integrated value determined by the electronic integrator.

A conventional direct current (D.C.) integrator generally develops an output signal having a value proportional to the time integral of the variable D.C. signals impressed thereon. Basic integrating circuits in current use comprise an integrating capacitor shunting an operational amplifier whereby a feedback loop about the operational amplifier is formed by the integrating capacitor. In general, the voltage across the feedback capacitor is proportional to the integral of the input current to the amplifier. The output of the integrator is linearly proportional to the time integral of the input signal only if the D.C. amplifier is drift stabilized, i.e., only if the signal level at the input of the operational amplifier is due to information bearing input signals alone, without a spurious signal caused by D.C. bias drift.

It is one of the main problems in D.C. amplifier use for analog computational and control purposes that the D.C. bias level drifts from zero in an unpredictable and uncontrolled manner. It is as a consequence of this drift, that errors in the integrating process result. If the initial starting condition of the integrator is a signal other than zero, then clearly the integrated output from the D.C. integrator will be a function not only of the input signals, but of the non-zero drift factor. Since the amount of drift, and variation in drift, is something that is not predictable since it is a consequence of various ambient factors, the output signal which is supposedly proportional to the integral of the input signals is incorrect by a variable and unpredictable amount.

It is the primary object of this invention, therefore, to provide a D.C. integrator having drift compensation provided by especially simple and inexpensive circuitry.

The D.C. integrator, in accordance with the invention, lends itself particularly to applications wherein a system is operated only during certain periods of time, which periods are determined by the output signal of the integrator. It is often the case that an analyzing or testing circuit operates to provide information only over specified periods of time. Thus, it may be that the test or analysis is supposed to stop (marking the end of one cycle) after certain of the input test parameters reach some predetermined value. In such an arrangement, the input signals to the D.C. integrator are integrated, and when the output of the integrator reaches the designed predetermined level, that test or analysis cycle is terminated. A specific description of such a system in operation is presented below.

In such a system, the D.C. integrator provides a sensitive control function, since its output signal interrupts or terminates the test or analysis cycle, and therefore controls the magnitude and fidelity of the test reading.

It is another object of this invention, therefore, to provide a D.C. integrating circuit wherein the output of the integrator may be utilized for terminating operations in related circuitry when the output of the D.C. integrator achieves a predetermined value.

In accordance with the principles of the invention, a D.C. amplifier with a feedback loop capacitor forming an integrator is provided, wherein the output terminal of the integrator is coupled to ground through the winding of a transfer relay. A second feedback loop around the amplifier may connect the amplifier output directly to its input and is adapted to shunt out the feedback capacitor of the first loop. The transfer relay has contacts such that when the feedback capacitor is in circuit, the direct shunt feedback loop is open-circuited and vice versa. In normal operation, that relay contact is closed which places the feedback capacitor in circuit. As a consequence, the system operates as an integrator; when the output signal of the integrator reaches a predetermined voltage level, and therefore a predetermined integrated input value, the transfer relay is energized such that the output side of the feedback capacitor is discharged to ground and simultaneously the relay contacts change their state such that the feedback loop including the capacitor is open-circuited; the direct shunt feedback loop is simultaneously closed so that the output of the D.C. amplifier is directly coupled to its own input. At the time of energizing the transfer relay, other contacts of the relay may be utilized to open and close circuits elsewhere in the system for various control purposes.

The potential on the input side of the integrating capacitor combined with the feedback signal caused by connecting the amplifier output to its own input, produces an input voltage required to provide substantially zero output from the amplifier. Therefore, at the commencement of the next integrating cycle, which may be started by manually or automatically resetting the transfer relay and reversing the state of the transfer contacts, the conditions are in existence at the input of the integrator for a zero potential at the output side of the integrator capacitor. In this way, the effects of drift are substantially eliminated.

The removal of the integrating capacitor from the circuit and the direct connection between the output and the input of the D.C. amplifier occur only during the non-integrating portion of the cycle, which commences only after the integrated signal achieves the predetermined and desired integral value.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings.

Figure 2:
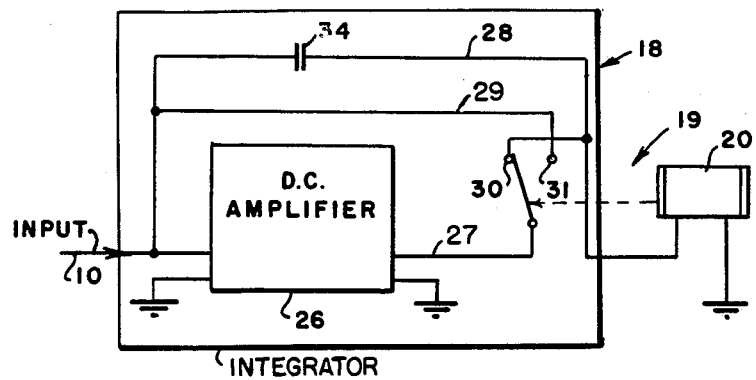

In the drawings:

FIGURE 1 is an illustrative block diagram circuit representation of an analysis and control system utilizing, in accordance with the principles of the invention, a drift compensated D.C. integrator; and FIGURE 2 is an illustrative schematic diagram of a drift compensated D.C. integrator in accordance with the invention.

FIGURE 1 discloses, for purposes of illustration, a system wherein the D.C. integrator in accordance with the invention may profitably be utilized. The system is an X-ray spectrometer with related equipment wherein the main system comprises an X-ray tube 11, a sample or specimen 12, a spectrometer 13 the output of which successively proceeds through amplifier 14, pulse height discriminator 15, and thence to counter 16. Concomitant with the operation of this main spectrometer channel is a control channel or loop commencing with the ion chamber 17 receiving radiation simultaneously with the receipt thereof by specimen 12. The output of ion chamber 17 is applied on conductor 10 to D.C. integrator 18 (which is discussed in detail below in FIGURE 2). The output of integrator 18 serves to control relay 19 having winding 20 and contacts 21 and 22. The contacts 21 and 22 in turn control the operation of the counter 16, which it may be recalled is at the output end of the X-ray spectrometer. In addition, the control unit 23 receives an input from the contacts 21 and 22, and is thereby set or controlled by the relay 19. The control unit 23 in turn provides mechanical outputs which control the operation of the spectrometer 13 and serve to reset the integrator 18, indicated by the mechanical control line 24; it also maintains the relay contacts in a predetermined condition for a specified period of time, to be discussed further below.

In operation, FIGURE 1 involves the generation of monochromatic X-radiation from tube 11, which excites the specimen 12 to fluorescence, that is, produces characteristic X-radiation emission from the specimen which is received by the X-ray spectrometer 13. The X-ray spectrometer is of the type well known in the art, wherein the X-radiation passes through a collimator and thence to a diffraction crystal which serves to provide the required X-ray diffraction needed for the spectrometric analysis. The radiation diffracted through the crystal is passed through another collimator and thence to a proportional detector providing a pulsed output to amplifier 14; the pulse frequency is dependent upon the amount of radiation transmitted to it from the diffraction crystal. The X-ray spectrometer, including the collimators, crystal and proportional detector are mounted on a goniometer in manner well known in the art, so that the crystal's angle relative to the specimen 12 may be varied for purposes of ascertaining the chemical composition of the specimen 12 under analysis. X-ray diffraction apparatus mounted on goniometers operating in the manner of the spectrometer 13 are disclosed, for example, in patent applications on "X-Ray Diffraction Apparatus" by Lloyd R. Rose, Serial No. 609,175, filed Sept. 11, 1956, and also Serial No. 789,910, filed Jan. 29, 1959.

The pulsed output from the proportional detector of the spectrometer 13 is applied to amplifier 14 to provide an amplified pulse train, and thence to pulse height discriminator 15 which operates to pass only those pulses above a predetermined amplitude level. The output of the discriminator is applied to a counter 16. This pulse counter serves to add the total number of pulses derived from the spectrometer while the diffraction crystal is at each specified angle of analysis. The counter is read out after the crystal is in a given angular orientation for a predetermined interval, which interval is not a function of time, but a function of the amount of X-radiation emanating from tube 11. The various angular orientations in combination with the total pulse counts for each of the angular orientations provides the required information for the X-ray analysis. To the end that the counter readings provide information of significance, however, it is necessary that the counter operate and thus sample the output of the X-ray spectrometer for a specified interval, so that the reading at different angular orientations of the crystal may be provided with a common basis for comparison. To keep the crystal in each angular orientation and to operate the counter concomitant with each angular orientation for a specified interval of time is insufficient for this purpose. This is so because the output level of the X-ray tube 11 may fluctuate and vary with the accelerating line voltage with the result that the intensity and total amount of X-radiation produced for equal periods of time may not be constant. In order to provide accurate test conditions, therefore, that which must be maintained constant for each angular orientation and each counter reading is the total amount of X-radiation that emanates from the X-ray tube. This is a function of both time and intensity.

To insure that this total amount of radiation remains constant for each angular reading, the control loop is provided. The ion chamber 17 is directly exposed to the X-radiation from tube 11. Consequently, variations in the line voltage of the tube and therefore in the radiation from the tube are sensed by the ion chamber 17. Chamber 17, therefore, provides an output current which varies as the radiation from tube 11. This current is applied to integrator 18 which integrates the input current to provide an output voltage that is linearly and directly proportional to the integral of the radiation from the tube 11. In series with the output of integrator 18 is the winding 20 of transfer relay 19. Relay 19 is of the type such that when the output voltage of integrator 18 reaches a predetermined level, the relay is energized and contact 22 which is normally closed, opens, while contact 21 which is normally opened, closes. As a consequence, a negative potential is applied from the battery coupled to contact 21 to the counter 16 and to control unit 23. The negative potential applied to the counter 16 may serve the function of stopping the operation of the counter 16. This may be accomplished in any of several ways well known in the art, as, for example, by applying the negative potential to a control grid of a gating tube. In this way, the operation of the counter is terminated by the gate.

In similar fashion, the potential through contact 21 is applied to the control unit 23, which may actuate electromechanical devices such as a servomechanism to rotate the goniometer of the X-ray spectrometer 13 via the mechanical linkage 25, so that the crystal detector is rotated to its next angular position for analysis of the specimen 12 during the next test period or cycle. Control unit 23 may also include means actuated by the voltage applied thereto for maintaining the contact 21 closed for a predetermined period of time. This may be done by the action of a slow motor, so that there may be ample time for the goniometer to be rotated to its next position and for the counter to be reset. After this predetermined period of time occurs, the contact 21 need no longer be closed and the mechanical control from control unit 23 to that contact is removed, and the contacts are then restored to their normal operating condition, i.e., contact 22 is closed and contact 21 open. Then the entire system is set to perform an analysis of the specimen at the next crystal angle orientation, and a new count may then be derived for that angular orientation.

It may be desirable that the predetermined integrated signal required to actuate relay 20 be of different magnitudes for different angular orientations of the crystal. This may be readily achieved by switching in a different integrating capacitor in the integrator 18 for each successive angular orientation. Control unit 23, through mechanical linkage, may perform this operation during non-integrating periods of operation.

From the description of FIGURE 1, it may be seen that the variation that may possibly occur in acceleration voltage applied to tube 11 is eliminated as a factor in the analysis of specimen 12, since the diffraction crystal remains in a given angular position for analysis, and the counter 16 counts the output therefrom for a period which is a function of the total amount of radiation that emanates from tube 11. This total amount of radiation is measured by the integrator 18, taking its input from ion chamber 17; the integrator in turn controls the operation of the spectrometer and counter as a function of a predetermined integrated value.

The integrator 18 performs a very delicate control function, since the accuracy of the integrated value is at the very core and essence of the accuracy of the entire spectrometric analysis. To provide accurate integration, a D.C. integrator may be utilized, but the problem of drift must be overcome.

FIGURE 2 is a schematic diagram of the integrator 18 in accordance with the principles of the invention, which provides accurate integration for the purposes of a system such as that of FIGURE 1, and in particular provides drift-free operation. An input terminal 10 is connected to a conventional D.C. amplifier 26. The output terminal 27 of the amplifier may be connected to one of two feedback loops 28 and 29, by transfer contacts 30 and 31 of relay 19, having winding 20. The feedback loop 28 through contact 30 includes an integrating capacitor 34, which feeds back to the input terminal 10 of the amplifier 26. The second feedback loop 29 through contact 31 is, in effect, a shunt loop for capacitor 34, which, when contact 31 is closed, serves to directly connect the output 27 of the amplifier back to its input 10. The relay winding 20 is in circuit with the output of amplifier 26 solely when contact 30 of the relay is closed. When contact 30 is opened and contact 31 is closed, on the other hand, so that the output of the amplifier is directly connected to its input 10, winding 20 of the relay is removed from the amplifier circuit.

Consider the operation of the amplifier circuit of FIGURE 2 with the contact 30 closed, so that the integrating capacitor 34 is in the operative feedback loop of the amplifier. The output of ion chamber 17 (FIGURE 1) is applied over the input lead 10 of the amplifier 26. In this normal D.C. amplifier integrator operation, the input D.C. signal starts to change the potential at the amplifier input 10, so that the output 27 to capacitor 34 produces a current in this capacitor proportional to the rate of change of output voltage. Thus, the voltage across capacitor 34 at any time is proportional to the integral of the input current with respect to time. This is under the assumption, of course, that the starting potential across the capacitor at the beginning of the integration process was zero, that is, it assumes that the amplifier 26 did not drift. Naturally, the existence of an initial drift voltage would include an error in the output signal and thus in the integration.

As the integrated signal, i.e., the output of the integrator formed by amplifier 26 and the capacitor 34, increases with increase in the input signal on terminal 10, the integrated signal approaches a level sufficient to energize the relay 19. The output side of the integrator, it may be noted, is connected through the relay winding 20 to ground. When the output of the integrator reaches a sufficiently large voltage, relay 19 is energized and the integrator capacitor is discharged to ground. Simultaneously, contact 30 is opened and contact 31 is closed, whereby the capacitor 34 is taken out of the feedback loop and the output 27 of amplifier 26 is directly connected back to its input 10 via the feedback lead 29.

The potential on the input side of the integrator capacitor 34 combined with the feedback signal caused by connecting the amplifier output 27 to its own input 10 produces a voltage required to produce substantially zero output from the amplifier. The D.C. amplifier 26, being a high gain amplifier, operates such that even the slightest amount of change of the input voltage provides a substantial variation in the output voltage. Essentially, then, connecting the output of the amplifier to the input constrains the input to a voltage level that is required to produce substantially zero output, even though the input may not be precisely zero.

The next integrating cycle is started by resetting the transfer relay contacts 30 and 31 such that the direct feedback connection is removed and the integrating capacitor 34 is reinserted in the feedback loop. At the start of the next integrating cycle, the integrating capacitor is at zero potential since the effects of drift have been substantially eliminated. In this way, an accurate integration cycle can be commenced in which voltage on the integrator capacitor 34 is proportional to the integral of the input current to the amplifier with respect to time.

Resetting of contacts 30 and 31 may be done manually, or automatically from the control unit 23 of FIGURE 1. Automatic operation may be simply obtained by having the voltage through contact 21 operate a slow motor driving a cam. The cam may then mechanically reset the relay contacts 21 and 22 of FIGURE 2 (and contacts 30 and 31 of FIGURE 1) or serve to actuate a pulse source for applying a reset pulse to relay coil 20. Other arrangements known in the art for resetting may also be used.

While I have shown a particular embodiment and application of my invention, it will be understood that many modifications may be made without departing from the spirit thereof, and I contemplate by the appended claims to cover any such modifications as fall within the true spirit and scope of my invention.

What I claim is:

1. A drift compensated direct current integrator comprising: a direct current amplifier having input and output terminals; a first feedback loop including an integrating capacitor connecting said output to said input; a second feedback loop providing a direct connection between said output and said input; a transfer relay winding in series with said integrating capacitor having one terminal grounded; said transfer relay having a transfer contact in each of said first and second feedback loops with the contact in said first feedback loop being normally closed and the contact in said second feedback loop being normally open, whereby solely one of said feedback loops is open-circuited at any given time; said transfer relay having parameters of a value such that said relay is energized at a predetermined level of integrated output signal from said capacitor; and means for reversing the state of said contacts a finite period of time after said transfer relay is energized.

2. For use in a control circuit wherein the length of successive periods of operation of the apparatus being controlled is determined by the integrated value of a parameter of said apparatus, means for integrating said parameter over each one of successive discrete intervals of time comprising: a direct current amplifier having input and output leads; a first feedback loop coupling said leads including an integrating capacitor and a first switch contact normally closed; a second feedback loop including a second switch contact normally open for directly connecting said output lead to said input lead when said second contact is closed; transfer switching means coupled to said integrating capacitor and amplifier output when said first contact is closed and adapted to normally maintain said first contact closed and said second contact open, whereby said transfer means is coupled to said amplifier during the integration operation; said transfer means being adapted to discharge said capacitor through a conductive load to ground when the voltage across said capacitor reaches a predetermined level and to reverse the normal states of said first and second contacts, whereby said transfer means is disconnected from said amplifier output during the non-integration period; and means operative a discrete interval of time after said capacitor is discharged for returning said contacts to their normal states.

3. A drift compensated electronic integrator comprising: a direct current amplifier; a feedback loop, including a capacitor and a first switch contact in series, from the output of said amplifier back to the input of said amplifier; a direct feedback connection, including a second switch contact, between the output of said amplifier and its input; a conductive path to ground in circuit with said capacitor when said first switch contact is closed; means for opening said first contact and closing said second contact after said capacitor is discharged through said conductive path to ground; said conducting path to ground includes a relay coil, and said means for opening and closing said first and second contacts is a relay armature operable by said coil.

References Cited in the file of this patent

UNITED STATES PATENTS

| | | |
|---|---|---|
| 2,673,929 | Huffman | Mar. 30, 1954 |
| 2,729,742 | Brauer | Jan. 3, 1956 |
| 2,846,522 | Brown | Aug. 5, 1958 |
| 2,848,624 | Friedman | Aug. 19, 1958 |
| 2,864,556 | Raymond | Dec. 16, 1958 |
| 2,877,308 | Reiner et al. | Mar. 10, 1959 |
| 2,891,725 | Blumenthal et al. | June 23, 1959 |
| 2,915,632 | Moore | Dec. 1, 1959 |
| 2,950,391 | Brumley | Aug. 23, 1960 |
| 3,008,640 | Hamblin et al. | Nov. 14, 1961 |
| 3,091,688 | Cook | May 28, 1963 |